UNITED STATES PATENT OFFICE 2,121,809

COMPOSITION CORK AND METHOD OF MAKING SAME

Charles E. McManus, Spring Lake, N. J., assignor to Crown Cork & Seal Company, Inc., Baltimore, Md., a corporation of New York No Drawing. Application September 14, 1934, Serial No. 744,095. Renewed July 30, 1937

13 Claims. (Cl. 106—22)

The present invention relates to cork composition air method of making same. By cork composition is meant a composite cork structure formed predominantly of cork granules in closely compacted relation and which are held together by a binder. Such cork composition is prepared in the form of blocks, cylinders, sheets and in various shapes of either final commercial state or in form suitable for fabricating operations.

It is an important feature of the present invention that the cork composition may be manufactured into the particular form or product by molding, extruding, packing, rolling or sheeting. This is made possible by coating the granules with a binder which, in its unset or unhardened condition, does not interfere with the free flowing of the binder coated cork. Thus, the binder coated cork in contradistinction to a sticky agglomerate may be fed or piped in predetermined amounts, intermittently or continuously, from a suitable storage receptacle or from a hopper to the forming instrumentality.

The cork compositon of the present invention possesses a light color comparable to natural cork and is characterized by possessing a maximum of cork properties. That is to say, the cork does not lose its identity and the product possesses enhanced compressibility and rebound. Also, the cork composition of this invention is resilient, flexible and elastic.

Cork composition is used in a variety of applitions and is subjected to varying temperature conditions, moisture and not infrequently to chemical action. The present cork composition meets these requirements and is also acid and alkali resistant, resistant to mold growth, free of odor or odor contaminations, does not shrink or curl and possesses a long life.

In addition to the various characteristics alluded to, the cork composition of this invention is free of glycol and hence does not impart objectionable taste to food products when used as a cushion liner for sealing caps nor does the cork composition react with the lacquers or other coatings associated with the metal cap. Again, the binder is compatible with various adhesives which are used in the case of so-called spot caps for adhering the foil or paper spot to the cork composition.

In the manufacture of cork composition the margin of profit is small and any reduction in production costs is of substantial advantage. The present cork composition may be formed in any economic time cycle; that is, the several operations including the making up of the binder, mixing with the cork, forming to shape and setting the binder to produce the final article are capable of accomplishment in a relatively short time period and with automatic apparatus.

In describing the cork composition and its method of manufacture, reference will be made to several embodiments, which, for convenience, will be denominated (1) tung oil-glue-gel and (2) tung oil-glue-resin-gel. As stated the cork composition is characterized by the absence of glycol.

Tung oil-glue-gel

By tung oil-glue-gel is meant a binder for the comminuted cork which comprises as its essential ingredients a suitable glue or gelatin, tung oil treated in a manner to be later described, and a dispersing agent for the tung oil and glue, e. g., glycerine, which is also a cork plasticizer. Also in some cases a suitable wax will be added to the gel or binder.

In the manufacture of a cork composition comprising a binder of this composition, there is employed a bodied tung oil. This is produced by taking tung oil or China-wood oil and subjecting the same to a temperature of substantially 450° to 500° F. in an open kettle for about one hour. Thereafter, the bodied product is preferably cooled to about 450° F. This treatment imparts to the tung oil a body or concentration which I find particularly useful in the manufacture of the binder. The tung oil is heated until it reaches a bodied state, and particular care is exercised not to carry the treatment further. In other words, the heating is checked when the oil becomes bodied and has the characteristic of a varnish maker's string.

Into the jacketed kettle or other suitable apparatus, there is placed a suitable amount of glycerine into which is flowed slowly and agitated the bodied tung oil which is dispersed in the polybasic alcohol. I prefer a dispersing agent of a character which will not attack varnishes, lacquers, and so forth, and for this reason do not use glycol which I have discovered by reason of its tendency to attack varnishes and lacquers, imparts a taste to beverages when the cork composition containing glycol is used in closure caps. The temperature of this mixture, either by preliminarily reducing the temperature of the tung oil or reducing the temperature of the mixture thereof with glycerine, should not be substantially above 180° F. to 200° F. to receive and dissolve the glue. A suitable bone or hide glue is added and the temperature of the mass is such as to not cause a chemical reaction with the glue or to result in any objectionable effect upon or deterioration of the glue base, such as would reduce its adhesiveness. The mixture of the bodied tung oil, glycerine, and glue is heated for about three hours with or without agitation to form a dispersion of the glue and tung oil in the cork plasticizer, producing what will be termed a gel.

The proportion of glue to glycerine can be varied, but is preferably in the ratio of four parts of the alcohol dispersing agent to one of glue. This ratio depends upon the strength and quality of the glue, since a strong glue may require as much as six parts of the dispersing agent. The glycerine acts as a solvent for the glue and tung oil and also as a plasticizer for the cork. Moreover, it does not attack lacquers or varnishes and therefore when this composition is used on closure caps it will not impart taste to beverages or the like.

As one example of the binder composition, there is used four pounds of glycerine, one pound of bodied tung oil and one pound of glue. It is preferable not to go above 180° F. in forming the gel, since higher or sustained temperatures tend to destroy or deteriorate the glue base so that it loses its adhesiveness. The mixture is cooled to substantially 160° F., and drawn off at this temperature for admixture with the granulated cork.

Before the binder is admixed with the cork, I add to it a suitable hardening agent for the glue. As hardening or tanning agents, I use formaldehyde, paraformaldehyde, or hexamethylenetetramine. For example, I make a hardening solution consisting substantially of one part hexamethylenetetramine and one and one-half parts water.

The hardening agent is mixed with the binder at substantially 160° F. and the binder is mixed for about thirty seconds with the comminuted cork in any suitable type of mixing machine. The cork granules are coated with this binder and immediately passed to a suitable mold or other forming instrumentality. The time period is important, in that it is necessary that the binder coated cork be supplied to the forming instrumentality before the hardening agent becomes effective to harden the glue.

As a modification of this procedure, the binder coated granulated cork, after mixing with the hardening agent, is passed to a chilling room. That is, the binder solution, including the hardening agent, is subjected to a thirty second mixing with the comminuted cork and thereafter immediately stored in bins or hoppers at a temperature of 40° F. The chilling room has substantially no humidity as tested by the wet bulb and is maintained cold by means of air washed and chilled at a low temperature. The storage of the binder coated comminuted cork at a low temperature will prevent any substantial hardening of the glue and it will be fed as required to the forming instrumentality.

In either case, the granules coated with a thin binder film will be free flowing, so that the apparatus will not be clogged. Moreover, the cork will be uniformly distributed, assuring a dense and uniformly compacted cork composition.

After the binder coated cork has been formed, the mold or other means is preferably passed for about two hours through a travelling oven heated to a temperature of substantially 290° F. to 300° F., whence the binder is set and dried. It is desirable not to go above 320° F. in the oven in order to avoid any possibility of charring the cork. After passage through the oven, the cork composition is cooled and removed from the forming means. This forming means may be a block mold, a cylinder mold, a sheet mold, a packing tube, or a rolling mill and articles of any desired size and shape will be produced.

In the manufacture of a cork composition in accordance with the above process, I use substantially one part glue, four parts glycerine and one part tung oil and four ounces of the hardening binder to each three pounds of the binder. Three pounds of this gel binder at substantially 160° F. will be mixed with about twelve to thirteen pounds of cork for forming the cork composition. These proportions are exemplary and will be substantially followed in large or bulk production.

The binder coated cork with or without the hardening agent, as stated, will be free flowing as distinguished from a sticky agglomerate. The step of forming may immediately follow the mixing operation or the binder coated cork may be stored and used as required. Throughout the operation, temperatures will be controlled so as to prevent any objectionable action upon the glue whereby it retains its maximum adhesiveness.

The use of a polybasic alcohol dispersing agent has the further important function of providing a cork plasticizer, thereby enhancing the flexibility, elasticity and life of the cork composition.

In referring to bodied tung oil, is meant a flowable concentrated body having a viscosity analogous to a string as understood in the varnish makers' art. Such oil is to be distinguished not only from ordinary or raw tung oil, but also from pre-solidified or gelled tung oil, such as is used in the linoleum industry.

The cork composition possesses a light color comparable to natural cork, a high tensile strength and is characterized by flexibility and a high degree of compressibility and rebound. This resilience of the cork composition is enhanced by the binder and, as heretofore stated, the cork properties are present in the cork composition in which the cork predominates by volume.

Instead of glycerine, I use any suitable dispersing agent for the tung oil and glue and preferably one which is the equivalent of glycerine in that it has the additional function of being a cork plasticizer and thereby adding to the resiliency, flexibility, elasticity and life of the product, e. g., sulphonated castor oil.

It is an important feature of the cork composition of this invention that it is highly resistant to acids, and will not attack lacquers, so that the cork composition may be utilized in closures for substantially all types of beverages and bottled food products. I find that the bodied tung oil has the property of protecting the glue against acid reactions.

The tung oil, moreover, is stable and completely overcomes any tendency either of shrinkage or expansion of the cork composition.

The binder being free of glycol will not objectionably react with the lacquers employed as a coating for metal caps and hence, there is no opportunity for disintegration or breaking down of such coatings. In the same manner, the binder is inert and does not attack the adhesives frequently used in the case of spot caps for adhering the metal or paper spot to the cork composition.

The cork composition is free of brittleness and is hygroscopic insuring continuous flexibility. It is, moreover, acid and alkali resistant, repugnant low enough to prevent any premature reaction or premature hardening of the resin or any chemical effect upon the glue, such as would cause it either to harden or deteriorate to lose its adhesive character. Thereafter, the binder formed of the mixture of gel dispersion and synthetic resin dispersion is mixed with a suitable hardener or accelerator for the resin, such as hexamethylenetetramine, oxalic acid or other organic acids as described in said Weisenburg applications. Preferably, the acid hardening agents are introduced in solution in a cork plasticizer solvent, such as glycerine, formed of equal parts of hardening agent and solvent. Glycol and sulphonated castor oil may be used but are unsatisfactory where the cork composition is used for beverage purposes.

The binder is then mixed with the cork granules and the cork composition is formed immediately or stored as heretofore described.

In preparing the binder, there is used two pounds of the gel dispersion to one pound of the resin, with a sufficient amount of oxalic acid or oxalic acid solution or other hardening agent as will effect curing of the synthetic resin under a temperature of substantially 280° F., and the pressure utilized in carrying out the molding or forming operation. The temperatures of the oven may vary slightly and the time period also may be changed for effecting a curing of this resin gel binder, depending upon the type of resin employed and the particular hardening agent. The gel resin binder will be added to the comminuted cork in the ratio of about three pounds of binder to about twelve to thirteen pounds of comminuted cork.

No tanning or hardening agent for the glue is necessary where an acid hardener is used, since free formaldehyde present by reason of the resin will serve this purpose. If, for any reason, there is insufficient of the hardener for the glue in the resin solution as prepared, one of the hardening agents above mentioned in suitable percentage will be added to tan the glue.

The cork composition product has all of the advantageous characteristics of the cork compositions heretofore described, and is acid proof and mold proof by reason of the presence of the resin. The cork composition will be useful in the various applications heretofore described and, in addition, may be used for screw cap rings in Mason jars and as the cushion liner material for closure caps used in sealing foods, such as pickles or products using a brine. The superior results secured by using a tung oil gel resin, as above described, are likewise present with a cork composition using a mixed resin binder.

In addition to a resin consisting of a phenol condensation product and a urea condensation product, I use other synthetic resins of the type mentioned. Preferably, these are likewise incorporated with a suitable solvent or cork plasticizer in a partially or semi-cured state.

In referring to the Weisenburg applications, it will be understood that there is used any of the resins as well as mixtures of resins and proteins therein described. The various resins and resin mixtures set forth in the Weisenburg applications and equivalents, all of which are utilized in forming the resin gel of this invention, have not been specifically recited in this application in order that the specification may not be unduly prolix.

The binder coated cork is free flowing, and it is to be noted that the resin, as well as the glue, is cured or set in the presence of the cork.

With respect to the glue gel adhesive, there is used vegetable and animal glue and/or gelatin of various kinds and properties as required, also albumen and casein; the term "glue" is used throughout this specification as inclusive of such adhesives which are defined in the "Chemical Dictionary" by Hachk, 1929.

While synthetic resins have been mentioned as preferred, natural resins are in a number of cases useful in lieu thereof. Thus resins such as the dammars, and copals are employed. Mixtures of natural and synthetic resins sometimes are used.

I have referred herein to the use in some cases of a binder including wax which is melted and added (a) to the gel binder, (b) to the gel binder before mixing with the resin, (c) to the resin binder before admixture with the gel and (d) to the gel-resin binder. This wax will have the required melting and hardening point for the intended cork composition and is of vegetable, animal or mineral origin. Paraffin, carnauba, beeswax, white and yellow wax are examples of those employed. In the case of beverage cap liners, the wax will preferably be one imparting neither taste nor odor to the cork composition. Again, the melting point of the wax will be selected in accordance with the use of the cork composition, i. e., the degree of heating to which the cork composition will be subjected. The wax in fluid condition will readily mix in most cases with the several binders and performs the function of a lubricant for the cork composition. This property is particularly true where the cork composition is extruded, the lubricant very materially aiding in the extruding operation, and is also assistive in the ordinary molding operation to overcome any possibility of sticking of the cork composition. Only a small percentage of wax is added to the binder, preferably an amount to exert in the particular cork composition a lubricating function. The wax, as will be appreciated, also has a binding action, stabilizes the cork composition and enhances its chemical resistance and waterproofing.

When the wax employed is not readily mixable with the binder, a suitable wax carrier may be employed as understood in the art, e. g., a latex or rubber mixture will be used.

Also, I make a very satisfactory cork composition for beverage purposes by using comminuted cork with which is mixed a binder-plasticizer comprising gelatin dissolved in a minimum of water and tung oil. An appropriate quantity of wax is added to this mixture if desired and in some cases glycerine. Also a resin is in some cases added to a gelatin-water-tung oil or gelatin-water-tung oil wax binder.

The cork composition in any of the embodiments described consists of the cork which predominates by volume, and the binder; the binder is provided in a thin film upon the cork particles and the mixture compressed and compacted into various forms, the binder being cured either during the forming operation or subsequent thereto. That is to say, while I have referred to forming and then curing the mix in a travelling oven with the cork composition confined in the forming instrumentality, the cork composition, where being extruded into rods or other shapes, will have the binder simultaneously cured concomitantly with the extruding operation, e. g., in the extrusion tube.

to mold growth, and resistant to heat and cold under high pressures, and moisture resistant. Moreover, the cork composition is free of odor and objectionable taste.

*Tung oil-glue glycerine resin gel*

By tung-oil-glue glycerine resin is meant a gel of the order of that previously described with which is incorporated a suitable resin preferably a synthetic resin, e. g., a phenol formaldehyde condensation product, a urea formaldehyde condensation product, a "cumaron" resin, or an alkyd resin. In fact, combinations of these resins may be used to form a binder of the desired properties. A suitable wax is in some cases incorporated in the gel binder before admixture with the resin or in the resin solution before admixture with the gel; the wax also may be added to the gel-resin mixture if desired.

A gel dispersion is prepared as previously described and drawn off at a temperature of about 140-160° F. There is then added to it a phenol formaldehyde condensation product prepared in the following manner.

A suitable mixture of phenol and formaldehyde solution together with oxalic acid, previously dissolved in enough water to form a solution, are mixed in a suitable vessel and heated slowly, preferably by means of steam until reaction starts. The steam is then shut off and the mixture is allowed to react for approximately twenty minutes in the heated vessel. Thereupon, cold water is run into the reaction product to cool the same and stop the reaction. The mass is permitted to settle for about forty-five minutes to one hour, so that the resin precipitates. The water is now siphoned off, and the resin is subsequently given several, i. e., about four, separate washes with water at a temperature of about 120° F. to remove the oxalic acid. In each case, the mass is permitted to settle for about twenty minutes to one-half hour and the water removed. The final product is now boiled under vacuum until the reaction product becomes clear, and substantially all remaining water is removed, and until the resin presents a viscous character having substantially the viscosity of a string. The resin is now preferably, but not necessarily, dissolved in a suitable plasticizer, for example, glycerine, and is ready for admixture with the gel dispersion. Glycol and sulphonated castor oil may be used instead of glycerine but are not satisfactory where the cork composition is used for cap liner material for beverages. The resin is in a partially cured state, and is preferably at a temperature of about 140° F. for admixture with the gel.

It is important to keep both the gel solution and the resin solution each at temperatures low enough to prevent any premature reaction or curing of the resin or any chemical effect upon the glue, such as would cause the adhesive base to deteriorate.

The resin or resin plasticizer solution having a temperature of substantially 140° F. is now mixed with the gel having a temperature of about 160° F., and, as stated, these temperatures are controlled to prevent any reaction of the glue or the resin. This mixing of the resin with the gel will preferably take place just prior to the addition of a hardening agent or accelerator for the resin. In the present instance, hexamethylenetetramine is used as the hardening agent and added to the binder. The binder at a temperature of about 140-160° F. is thereupon mixed with the cork and in the manner above described.

The binder coated cork is either passed to the forming instrumentality or stored at a low temperature in a chilling room, as above mentioned.

In forming the cork composition, two pounds of gel and one pound of phenolic resin are mixed as described, and to this mixture is added four ounces of the hexamethylenetetramine solution for each three pounds of binder. The binder is incorporated with the comminuted cork in the ratio of three pounds of binder to substantially twelve to thirteen pounds of comminuted cork. These proportions are purely exemplary, but are substantially followed in preparing the cork composition on a commercial scale.

The cork composition has all of the advantages of the cork composition above described, and in employing hexamethylenetetramine as a curing agent for the resin, as well as the glue, there results a substantial saving in chemicals.

Moreover, the presence of the tung oil accelerates the action of the hexamethylenetetramine in curing the resin. Observation discloses that the curing action of the hexamethylenetetramine is relatively slow in curing the resin in the absence of the tung oil, whereas in the presence of the tung oil, the curing is quite rapid and from the manufacturing standpoint, very efficient.

The tung oil, moreover, has the effect of absorbing any phenol odor. It appears that the free phenol and formaldehyde reacts with the tung oil forming a non-odorous reaction product adding to the tenacity and resistance of the binder.

This reaction product forms on the cork particles as a tough film comparable to a varnish gum which is non-hygroscopic and is stable in the air. The cork composition is free of shrinkage or expansion and this stability appears directly attributable to the stabilizing influence of the tung oil.

An important characteristic of the cork composition is its resistance to acids, the tung oil and the resin rendering the glue substantially inert in the presence of acid conditions. Thus, a high percentage of gel to resin can be employed where necessary, because the tung oil protects the gel against acid reactions.

As stated above, the product is free of odor and particularly phenol odor, which is a very desirable characteristic, and is mold proof.

The cork composition is useful in the various applications above described and by reason of the presence of the cork plasticizers which also act as solvents for the glue and the resin, the product is resilient, flexible, elastic and possesses a long life.

As a further example of a resin gel binder, and instead of using a single condensation product, a mixture or combination of condensation products is employed. The binder is prepared in the following manner.

A gel solution is prepared, as previously described, and drawn off at a temperature of substantially 160° F. There is then added to it a binder mixture of phenol formaldehyde resin and urea formaldehyde resin in a suitable plasticizer solvent, e. g., glycerine, prepared in accordance with the applications of Andrew Weisenburg, Serial No. 497,615, Serial No. 497,616 and Serial No. 675,636.

The resin or resin solution in a partially cured state and at a temperature of substantially 140° F. is added to the gel which is at substantially 160° F. It is important to keep the glue gel dispersion and the resin dispersion at temperatures The various cork compositions herein described are useful for the manufacture of gaskets, window channels, bottle cap liners, and in all of the various applications in which cork composition is now utilized. The cork composition is particularly useful in the bottle cap art, since it is devoid of free glycol or other agents which tend to attack varnishes and lacquers and thereby impart taste to beverages and other liquids.

I claim:—

1. A free flowing composition of matter comprising cork granules coated with a binder comprising bodied tung oil and a glue, said binder being in a non-tacky state.

2. A cork composition comprising cork granules, bodied tung oil and a glue, said cork predominating by volume, and said glue and said tung oil being present in amount to constitute a binder.

3. A cork composition comprising cork granules, bodied tung oil and a glue in amount to constitute a binder therefor, and a cork softener and plasticizer, said comminuted cork predominating by volume.

4. A cork composition comprising cork granules, bodied tung oil and a glue in amount to constitute a binder therefor, and a hardening agent for the glue, said comminuted cork predominating by volume.

5. A cork composition comprising cork granules, bodied tung oil and a glue in amount to constitute a binder therefor, a cork softener and plasticizer, and a hardening agent for the glue, said comminuted cork predominating by volume.

6. The process of making a cork composition, comprising heating tung oil to change its chemical structure and viscosity to the point where it has substantially the consistency of a varnish maker's string, mixing the bodied tung oil with a softening agent for cork, including in the mixture a glue, dispersing the tung oil and glue in the softening agent to form a substantially homogeneous binding mixture, including a hardening agent in the binder mixture, then coating the binding mixture upon a mass of cork granules, and molding the binder coated cork.

7. The process of making a cork composition, comprising heating tung oil to change its chemical structure and viscosity to the point where it has substantially the consistency of a varnish maker's string, mixing the bodied tung oil with a softening agent for cork, including in the mixture a glue, dispersing the tung oil and glue in the softening agent to form a substantially homogeneous binding mixture, including a hardening agent in the binding mixture, then coating the binding mixture upon a mass of cork granules and maintaining the binder coated cork in a chilled atmosphere having such a temperature and humidity as will maintain the binder upon the cork particles in a substantially non-tacky state and prevent action of the hardening agent.

8. A cork composition comprising cork granules, bodied tung oil, a glue, and a wax, said cork predominating by volume, and said glue and said tung oil being present in amount to constitute a binder.

9. A cork composition comprising cork granules, bodied tung oil and a glue in amount to constitute a binder therefor, and a cork softener and plasticizer comprising a polyhydric alcohol, said comminuted cork predominating by volume.

10. A cork composition comprising cork granules, bodied tung oil, a resin and a glue, said glue and tung oil being present in amount to constitute a binder, and said cork predominating by volume.

11. A cork composition comprising cork granules, a plasticizer, bodied tung oil, a resin and a glue, said glue and tung oil being present in amount to constitute a binder, and said cork predominating by volume.

12. A cork composition comprising cork granules, bodied tung oil, a wax, a resin and a glue, said glue and tung oil being present in amount to constitute a binder, and said cork predominating by volume.

13. A cork composition comprising cork granules, a plasticizer, bodied tung oil, a wax, a resin and a glue, said glue and tung oil being present in amount to constitute a binder, and said cork predominating by volume.

CHARLES E. McMANUS.